US009317981B2

(12) United States Patent
Friedrich

(10) Patent No.: US 9,317,981 B2
(45) Date of Patent: Apr. 19, 2016

(54) METHOD AND DEVICE FOR PROTECTING PRODUCTS AGAINST COUNTERFEITING

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 1856 days.

(21) Appl. No.: 12/018,023

(22) Filed: Jan. 22, 2008

(65) Prior Publication Data

US 2008/0196106 A1 Aug. 14, 2008

Related U.S. Application Data

(60) Provisional application No. 60/881,447, filed on Jan. 22, 2007.

(30) Foreign Application Priority Data

Jan. 19, 2007 (DE) ......................... 10 2007 003 514

(51) Int. Cl.

| | |
|---|---|
| ***G06F 7/04*** | (2006.01) |
| ***G06F 12/00*** | (2006.01) |
| ***G06F 12/14*** | (2006.01) |
| ***G06F 5/00*** | (2006.01) |
| ***G06F 13/00*** | (2006.01) |
| ***G07C 9/00*** | (2006.01) |
| ***G07G 1/00*** | (2006.01) |

(52) U.S. Cl.
CPC ............ *G07C 9/00111* (2013.01); *G07G 1/009* (2013.01)

(58) Field of Classification Search
CPC ................................................... G07C 9/00111
USPC ......... 726/27, 34; 713/193; 710/36; 711/145, 711/163
See application file for complete search history.

(56) References Cited

U.S. PATENT DOCUMENTS

| | | | | |
|---|---|---|---|---|
| 6,508,400 | B1 * | 1/2003 | Ishifuji et al. | 235/382 |
| 2002/0157011 | A1 * | 10/2002 | Thomas, III | 713/193 |
| 2003/0220876 | A1 | 11/2003 | Burger et al. | |
| 2004/0066278 | A1 | 4/2004 | Hughes et al. | |
| 2004/0078511 | A1 * | 4/2004 | Vogt et al. | 711/103 |
| 2004/0158822 | A1 * | 8/2004 | Sandham et al. | 717/138 |
| 2005/0050367 | A1 | 3/2005 | Burger et al. | |
| 2005/0253683 | A1 | 11/2005 | Lowe | |
| 2006/0130693 | A1 * | 6/2006 | Teowee | 102/215 |
| 2006/0274920 | A1 | 12/2006 | Tochikubo et al. | |
| 2007/0008070 | A1 | 1/2007 | Friedrich | |
| 2008/0073789 | A1 * | 3/2008 | Harris | 257/758 |

FOREIGN PATENT DOCUMENTS

| | | | |
|---|---|---|---|
| EP | 1 742 166 | A1 | 1/2007 |
| WO | WO 2007/080458 | A1 | 7/2007 |

* cited by examiner

*Primary Examiner* — Aravind Moorthy
(74) *Attorney, Agent, or Firm* — Fish & Richardson P.C.

(57) ABSTRACT

A method for protecting a product against counterfeiting is provided that has a transponder associated with the product, upon which at least one unique identifier is stored, wherein a flag in a set or cleared state is associated with the identifier, and when the flag is set, read access to the identifier by a reader is only permitted after authentication. The invention further relates to a transponder for protecting a product against counterfeiting.

27 Claims, 1 Drawing Sheet

METHOD AND DEVICE FOR PROTECTING PRODUCTS AGAINST COUNTERFEITING

This nonprovisional application claims priority to German Patent Application No. DE 102007003514, which was filed in Germany on Jan. 19, 2007, and to U.S. Provisional Application No. 60/881,477, which was filed on Jan. 22, 2007, and which are both herein incorporated by reference.

BACKGROUND OF THE INVENTION

1. Field of the Invention

The present invention relates to a method and a device for protecting a product against counterfeiting, having associated with the product a transponder on which at least one unique identifier is stored.

2. Description of the Background Art

In many cases, it is difficult or impossible to distinguish counterfeit products from original products at first glance. Counterfeits inflict losses at unacceptable levels on producers of original products, however. Consequently, there is a desire to identify products or goods in general in such a way that original products can be distinguished quickly and unambiguously from counterfeits in a simple way.

A variety of noncontacting identification systems, or so-called radio frequency identification (RFID) systems, are used to monitor a flow of goods. Such a system typically includes a base station or a reader or reader unit and a plurality of transponders or remote sensors (tags), which are located in the response area of the base station at the same time. The transponders and their transmitting and receiving devices customarily do not have an active transmitter for data transmission to the base station. Non-active transponders are called passive transponders if they do not have their own energy supply, and semi-passive transponders if they have their own energy supply. Passive transponders take the energy they require for their supply from the electromagnetic field emitted by the base station.

In general, something known as backscatter coupling is used to transmit data from a transponder to the base station using UHF or microwaves in the far field of the base station. To this end, the base station emits electromagnetic carrier waves, which the transmitting and receiving device in the transponder modulates, using a modulation method, and reflects appropriately for the data to be transmitted to the base station. The typical modulation methods for this purpose are amplitude modulation, phase modulation and amplitude shift keying (ASK) subcarrier modulation, in which the frequency or the phase position of the subcarrier is changed.

An access control method for transponders is described in the proposed standard ISO/IEC_CD 18000-6C dated Jan. 7, 2005. In this method, the transponder is first selected from among a plurality of transponders in a selection or arbitration process. The selection method described is a stochastic method in the form of a slotted ALOHA method. Such selection methods are described in detail in, for example, the "RFID Handbuch," a textbook by Klaus Finkenzeller, HANSER Verlag, third edition, 2002, which has been published in English by John Wiley & Sons.

Once the transponder has been selected or isolated, the reader transmits a query to the transponder in the form of a return transmission of a random number previously transmitted by the transponder as part of the arbitration process, whereupon the transponder transmits protocol control bits (PC) and an identifier in the form of an electronic product code (EPC) to the reader. The protocol control bits contain information regarding a physical layer of the transmission path. Among other things, the identifier or the electronic product code EPC reflects a product identified by the transponder. The assignment of the EPC to the identified product is standardized, so that the product can be deduced from knowledge of the EPC.

A plurality of identifiers can be stored on the transponder, such as the EPC, a transponder-specific identifier known as the tag ID, and/or a communications-specific identifier such as a key identification. It is also possible, for example, for a manufacturer to identify his products with a specific manufacturer identifier. However, it is possible to bring counterfeit products on the market as so-called clones of the original product by reading out one or more identifier(s) from a transponder and using these identifier(s) on another transponder to label a product.

In order to be able to distinguish original products from counterfeits using an identifier, a data comparison can be performed using a suitable database. By this means, it is possible to determine whether a transponder-specific identifier issued only once has already been sighted in another location, and/or whether counterfeiting of an item is to be inferred for other reasons, for example on the basis of inconsistencies in its history. In other words, certain indicators are collected as a result of the data comparison that make it possible to infer a counterfeit, but this does not provide protection for the original products. A (global) data comparison and an analysis of the data to ferret out counterfeits is therefore only possible with great effort and expense.

Moreover, a global data comparison results in a conflict of goals: on the one hand the identifier is published as widely as possible so that a clone can be detected as quickly as possible, but on the other hand this wide publication makes it easier to read out the identifier and produce a clone.

In order to prevent a transponder from being used for a clone, it is known to assign to the transponder a unique, transponder-specific identifier at manufacture, which is protected by hardware means against overwriting. A transponder of this nature thus cannot be used for a counterfeit by overwriting the transponder-specific identifier. Nonetheless, transponders that are produced without write protection can still be overwritten in the corresponding memory areas.

SUMMARY OF THE INVENTION

It is therefore an object of the present invention to provide a method and a device for protecting a product against counterfeiting with a transponder associated with the product.

This object is attained by a method for protecting a product against counterfeiting with a transponder associated with the product, upon which at least one unique identifier is stored, wherein a flag in a set or cleared state is associated with the identifier, and read access to the identifier by a reader is only permitted after authentication when the flag is set.

According to the invention, when the flag is set, read access to the identifier, in particular to a transponder-specific identifier such as a unique transponder serial number, is only possible after authentication, which is to say after a successful identity verification. Authentication takes place in compliance with the aforementioned ISO/IEC_CD 18000-6C standard, for example. If a reader transmits a read command for the identifier in the case of a set flag, and no authentication has taken place, the transponder replies with an error identifier or sends no reply.

Depending on the application, blocking of a read access to additional identifiers, for example the EPC, is also advantageous. For example, if the EPC is freely readable, it is possible to infer the content of a container in a simple way by bringing a reader into the appropriate vicinity, thus ferreting out high-value products or the like in a simple way.

In an embodiment of the invention, the flag is at least one binary variable, which can assume at least two states, customarily 0 and 1. The 0 state here is generally designated as a cleared flag, and the 1 state as a set flag. In other embodiments, a reversed assignment of the states is possible, however.

In a embodiment of the invention, the flag is set in a non-reprogrammable memory area and/or is protected by hardware means against overwriting once set. The memory area is, for example, a nonvolatile memory area that can only be written once (one time programmable, OTP). A setting of the flag and/or a protection against overwriting, i.e., what is known as locking, preferably takes place as early as manufacture of the transponder. However, it is also possible for the flag to be set at a later point in time instead.

In another embodiment of the invention, an emulated flag is used, wherein at least one bit of the identifier is used to emulate flagging of the identifier. In other words, when the flag is emulated, it is "simulated" by a bit of the identifier, without providing separate memory areas on the transponder for the flag. AND and/or XOR operations are possible for the combination. In one embodiment, the bits of the identifier are wired to a D flip-flop, wherein a set state is emulated when at least one bit of the identifier is set.

In an embodiment, a security element, such as a check digit or polynomial for error correction, is associated with the identifier. Manipulation of the identifier, or of individual parts of it, can then be detected by checking the check digit, for example.

In another embodiment, the identifier and/or the security element is stored in a protected memory area, wherein the memory area is only accessible following authentication. For example, it is possible to store the identifier in a memory area which can only be addressed through commands of the aforementioned standard that require prior authentication. When the flag is set, then, an additional security level is built in, which demands another password or a certain command, for example.

In another embodiment of the invention, the identifier and/or the security element is stored in a hidden memory area, wherein the address of the memory area is not made public and/or access to the memory area requires a command that is not made public. Here, reading out the identifier from the hidden memory area (shadow memory) is only possible with knowledge of the address and/or of the secret command.

In another embodiment of the invention, the identifier and/or the security element is written to a non-reprogrammable memory area of the transponder and/or is protected by hardware means against overwriting and/or clearing. Consequently, the identifier of the transponder cannot be changed arbitrarily by a user. In the case of protection against clearing, binary cells which are set, which in the general case means are set to 1, cannot be cleared, which is to say set to 0. In this way, although it is indeed possible to manipulate an identification number, it is not possible to write any desired identification number on the transponder. Especially when a security element has been assigned to the identifier, manipulation of the number can easily be detected here through an erroneous check digit.

In an aspect, the identifier and/or the security element is written to the transponder during manufacture, in particular during a wafer test. After manufacture, especially after the measuring procedure (wafer test), the identification number can no longer be cleared or changed.

In another embodiment, the identifier is composed of data concerning a lot number, a wafer number and/or a position on the wafer. The corresponding information can then be retrieved from the identifier by authorized users through reverse inference.

In another embodiment of the invention, the identifier is stored on the transponder in encrypted form. Encrypted storage of the identifier is advantageous when concealment of the products is of interest, for example.

During the manufacturing process, writing of a transponder-specific identifier to the transponder usually takes place prior to the writing of a product-specific identifier such as an EPC. This is exploited in another embodiment of the invention, in which the identifier is a transponder-specific identifier, and an EPC is constructed, at least in part, using the transponder-specific identifier. Manipulation of the identifier here can be detected through a lack of agreement with an associated EPC. It is possible to implement an interaction of this nature between the identifiers, especially in the case of an extended EPC, which includes additional information along with the information hitherto provided in the EPC in accordance with the standard. Within the meaning of the invention, the combination of EPC and protocol control bits PC or extended protocol control bits XPC is also understood to be an extended EPC. When an extended EPC is used, it is possible in another embodiment that a symmetric password is made available for authentication through the EPC. This password is encrypted for transmission here, for example using asymmetric encryption.

The object is further attained by a transponder for protecting a product associated with the transponder against counterfeiting, upon which transponder at least one unique identifier is stored, wherein a flag in a set or cleared state is associated with the identifier, and when the flag is set, read access to the identifier by a reader is only permitted after authentication.

In an embodiment, the flag is comprised of a binary variable. Alternatively or in addition thereto, an emulated flag can be provided as the flag. The identifier preferably contains a security element such as a check digit, so that manipulation can be detected easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
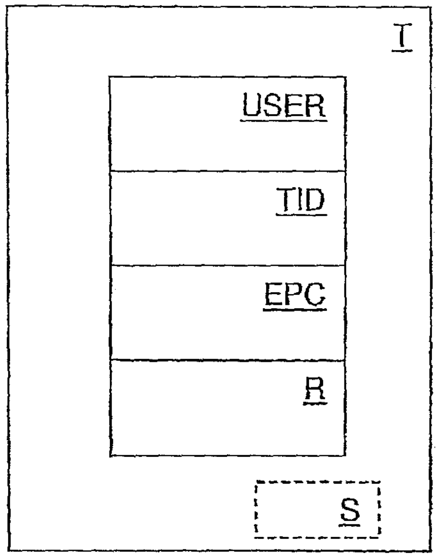
FIG. 1 is a schematic representation of a memory structure of a transponder.

FIG. 1 schematically shows a transponder T of an RFID system that is not further illustrated. The transponder T is, for example, an ISO/IEC18000-6C-compliant transponder. In this context, the transponder T has four memory levels or memory areas, namely a reserved area R, an EPC memory area EPC, a transponder identification area TID, and a user area USER. In the exemplary embodiment shown, a shadow memory area S is additionally provided, which can only be addressed through specific command sequences and/or with the knowledge of an associated, unpublished address pointer. Stored in the shadow memory area S is an identifier ID, which uniquely identifies the transponder T. In other embodiments of the invention, a unique, product-specific identifier can be stored, for example in the EPC memory area EPC or in the transponder identification area TID. The user area USER is typically used for storage of additional data.

Figure 2:
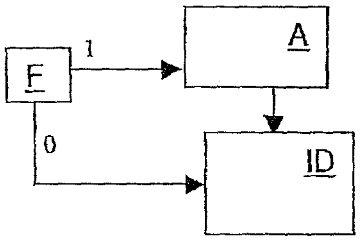
FIG. 2 is a schematic representation of a process of accessing a stored identifier.

FIG. 2 schematically shows an access to an identifier ID which is stored in the shadow memory area S shown in FIG. 1. A flag F is associated with the identifier ID. If the flag F is cleared, which is to say set to 0 in the exemplary embodiment shown, then read access to the identifier ID is directly possible. If, in contrast, the flag F is set, which is to say set to 1 in the exemplary embodiment shown, then read access to the identifier by a reader (not shown) is only possible following a successful authentication A.

Addressing of the corresponding memory area in the shadow memory area S is required for read access to the identifier ID. Without knowledge of the address of the memory area, reading out the identifier ID is only possible with great difficulty, even when the flag F is cleared. Consequently, in one embodiment of the invention, the address of the memory area where the identifier is stored is only provided to selected persons or groups of persons.

As the flag F, a binary variable can be stored on the transponder T, which preferably is protected against overwriting by suitable measures. In other embodiments, the flag is emulated.

Figure 3:
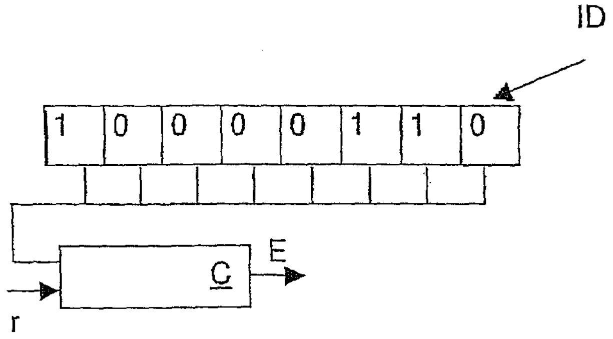
FIG. 3 is a schematic representation of a circuit for emulation of a flag.

FIG. 3 schematically shows a circuit C for emulation of a flag F. For this purpose, the memory contents of the identifier ID are combined through suitable logical operations in the event of a read operation r, so that the response to an access attempt by the read command is an error code E. Not until authentication has successfully taken place is read access granted. Emulation of the flag F is possible, for example, through an AND combination of the bits of the identifier ID with a clock signal and a D flip-flop that follows. If at least one bit of the identifier is set, then a set flag is “emulated” here. Other operations are possible in other embodiments.

The transponder T from FIG. 1 can be applied directly to a product, such as an item of clothing or associated packaging, for example. In this connection, all data identifying the flow of products or goods for the product in question can be stored on the transponder. In this way, it is possible at any point in time to trace information on the product, for example the item of clothing. Due to this traceability, it is also possible to distinguish counterfeits from original products. Thus items of clothing, for example, can be produced in any desired country and provided with transponders. When the items of clothing are then shipped in a container or the like to other countries, counterfeits can be easily distinguished there from original products while still in the container by reading out the transponders.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:

receiving a request to access a first unique identifier stored in a shadow memory area of a transponder, read access to the first identifier being based on a state of a flag and on knowledge of secret shadow memory access information, the transponder having a second unique identifier stored in a second memory area;

requiring authentication prior to permitting read access to the first identifier in response to the state of the flag having a first value; and permitting read access to the first identifier when the request includes the secret shadow memory access information.

2. The method of claim 1 further comprising preventing overwriting the state of the flag by writing the flag in a non-reprogrammable memory area.

3. The method of claim 1 further comprising analyzing a bit of the first identifier used to emulate the state of the flag.

4. The method of claim 3, wherein analyzing at least one bit of the first identifier comprises combining the bit of the at least one unique identifier with a clock signal.

5. The method of claim 1 further comprising detecting manipulation of the first identifier through a state of a check digit associated with the identifier.

6. The method of claim 1 wherein the first identifier stored in the shadow memory area is encrypted.

7. The method of claim 1 further comprising constructing a portion of the second identifier using the first identifier.

8. The method of claim 1, wherein the secret shadow memory access information comprises one or more of:

a secret memory address; and a secret access command.

9. The method of claim 1, further comprising:

receiving a request to access the second unique identifier stored in the second memory area of the transponder, read access to the second identifier being based on the state of the flag; and requiring authentication prior to permitting read access to the second identifier in response to the state of the flag having a first value.

10. A transponder comprising:

a shadow memory area storing a first unique identifier, read access to the first identifier being based on a state of a flag and on knowledge of secret shadow memory access information;

a second memory area storing a second unique identifier; and one or more computer-readable non-transitory storage media coupled to the memory areas that embody logic that is operable when executed to:

receive a request to access the first identifier stored in the shadow memory area;

require authentication prior to permitting read access to the first identifier in response to the state of the flag having a first value; and permit read access to the first identifier when the request includes the secret shadow memory access information.

11. The transponder of claim 10, wherein the logic is further operable to prevent overwriting of the state of the flag by writing the flag in a non-reprogrammable memory area.

12. The transponder of claim 10, wherein the logic is further operable to analyze a bit of the first identifier used to emulate the state of the flag.

13. The transponder of claim 12, wherein the logic to analyze at least one bit of the first identifier is further operable to combine the bit of the at least one unique identifier with a clock signal.

14. The transponder of claim 10, wherein the logic is further operable to detect manipulation of the first identifier-through a state of a check digit associated with the at least one unique identifier.

15. The transponder of claim 10, wherein the first identifier stored in the shadow memory area is encrypted.

16. The transponder of claim 10, wherein a portion of the second identifier is constructed using the first identifier.

17. The transponder of claim 10, wherein the secret shadow memory access information comprises one or more of:

a secret memory address; and a secret access command.

18. The transponder of claim 10, wherein the logic is further operable to:

receive a request to access the second unique identifier stored in the second memory area of the transponder, read access to the second identifier being based on the state of the flag; and require authentication prior to permitting read access to the second identifier in response to the state of the flag having a first value.

19. One or more non-transitory computer-readable storage media that embody logic that is operable when executed to:

receive a request to access a first unique identifier stored in a shadow memory area of a transponder, read access to the at least one unique identifier being based on a state of a flag and on knowledge of secret shadow memory access information, the transponder having a second unique identifier stored in a second memory area;

require authentication prior to permitting read access to the first identifier in response to the state of the flag having a first value; and permit read access to the first identifier when the request includes the secret shadow memory access information.

20. The one or more non-transitory computer-readable storage media of claim 19 wherein the logic when executed is further operable to prevent overwriting the state of the flag by writing the flag in a non-reprogrammable memory area.

21. The one or more non-transitory computer-readable storage media of claim 19, wherein the logic when executed is further operable to analyze a bit of the first identifier used to emulate the state of the flag.

22. The one or more non-transitory computer-readable storage media of claim 21, wherein analyzing at least one bit of the first identifier further comprises combining the at least one bit of the first identifier with a clock signal.

23. The one or more non-transitory computer-readable storage media of claim 19, wherein the logic when executed is further operable to detect manipulation of the first identifier through a state of a check digit associated with the first identifier.

24. The one or more non-transitory computer-readable storage media of claim 19, wherein the first identifier stored in the shadow memory area is encrypted.

25. The one or more non-transitory computer-readable storage media of claim 19, wherein a portion of the second identifier is constructed using the first identifier.

26. The one or more non-transitory computer readable storage media of claim 19, wherein the secret shadow memory access information comprises one or more of:

a secret memory address; and a secret access command.

27. The one or more non-transitory computer-readable storage media of claim 19, wherein the logic when executed is further operable to:

receive a request to access the second unique identifier stored in the second memory area of the transponder, read access to the second identifier being based on the state of the flag; and require authentication prior to permitting read access to the second identifier in response to the state of the flag having a first value.

* * * * *